Patented Dec. 2, 1947

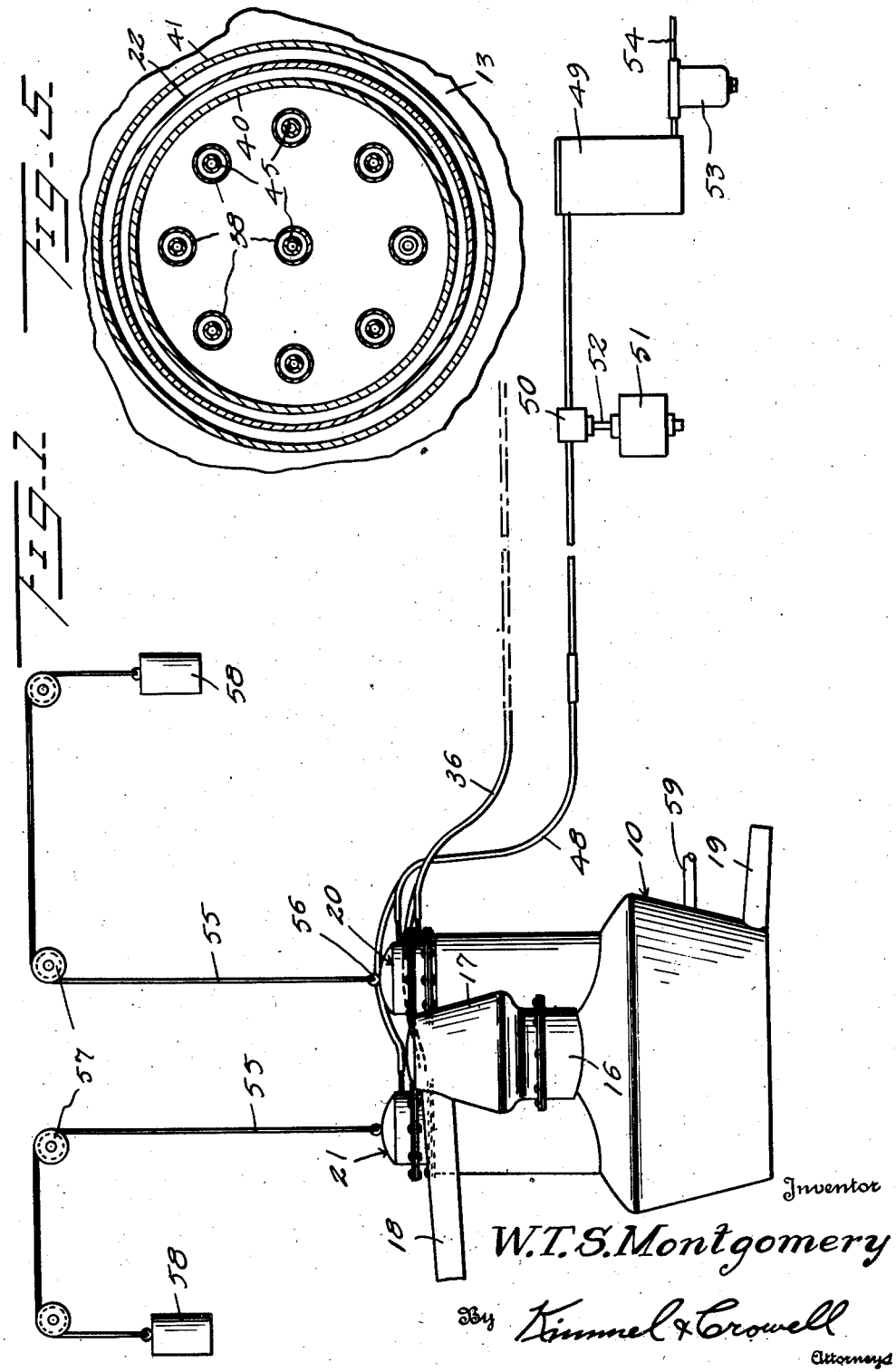

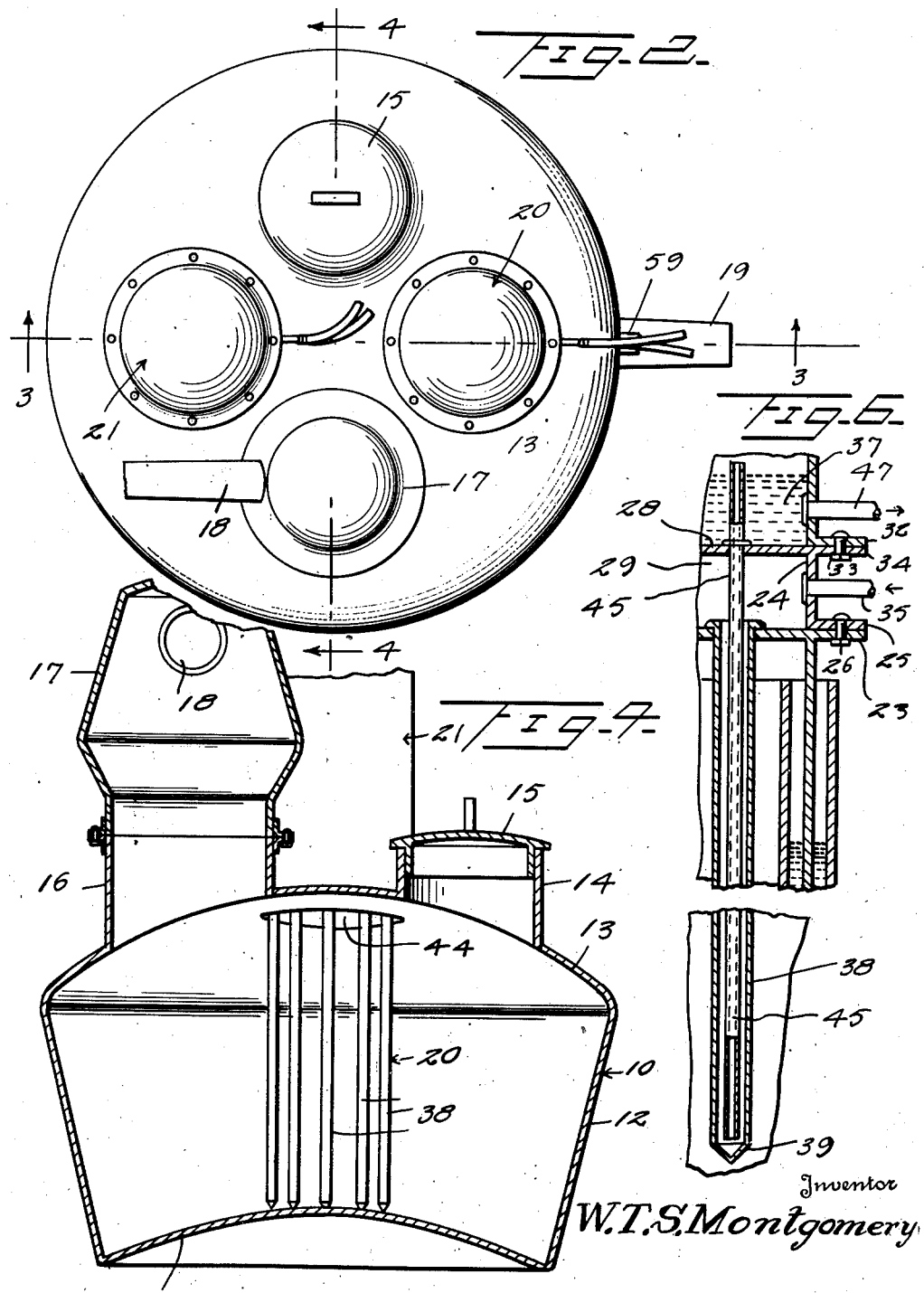

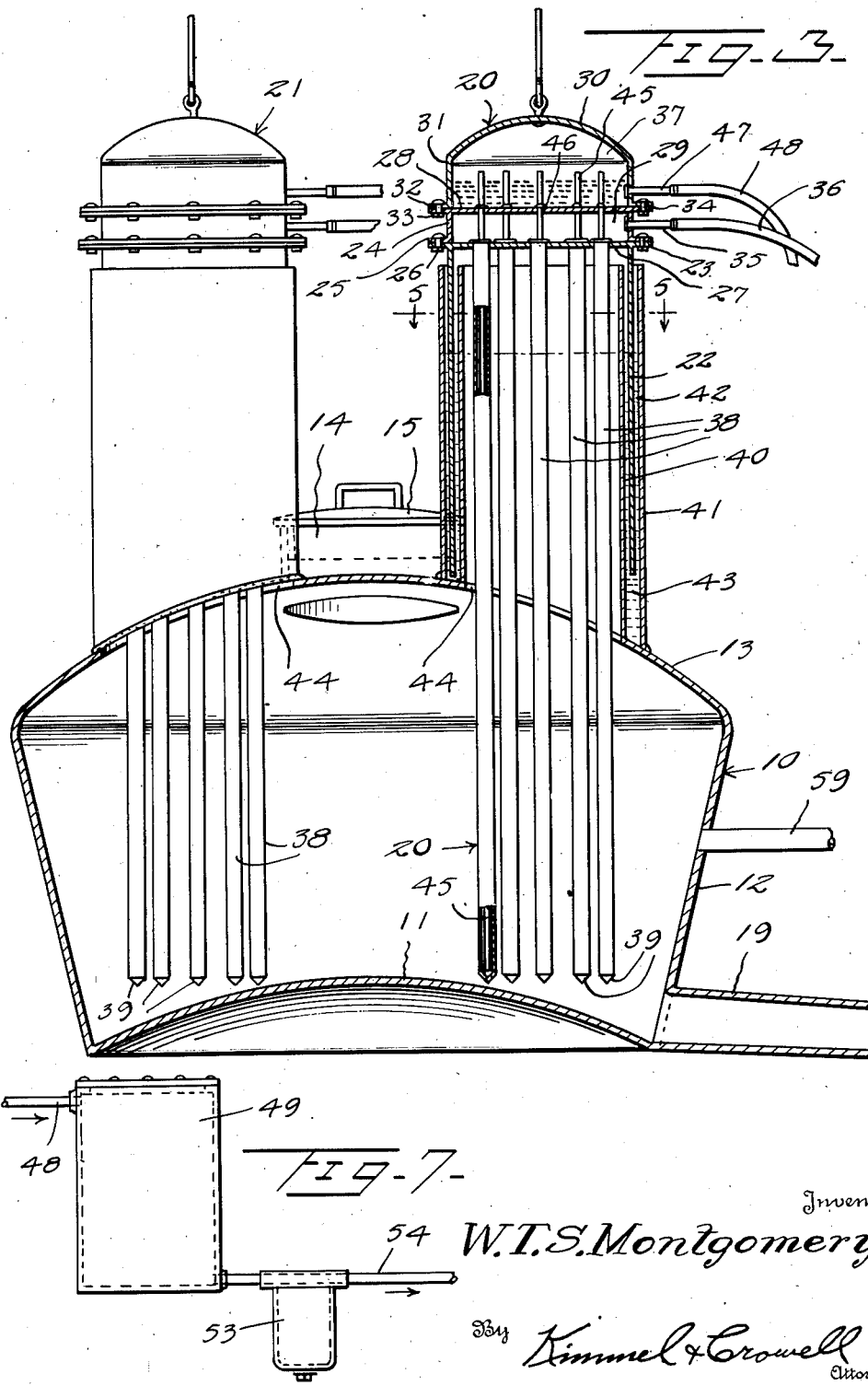

2,431,820

UNITED STATES PATENT OFFICE 2,431,820

STILL WITH VERTICALLY MOVABLE HEATER

William T. S. Montgomery, Jacksonville, Fla.

Application July 17, 1944, Serial No. 545,373

3 Claims. (Cl. 202—235)

1

This invention relates to turpentine stills.

An object of this invention is to provide an improved turpentine still by means of which the gum may be more readily and quickly heated.

Another object of this invention is to provide a still of this kind embodying heating members which, during the heating operation, are extended downwardly into the still and which may be elevated out of the resin or other material so as to permit of the removal of trash or other material floating on top of the gum.

A further object of this invention is to provide an improved means for removing the condensed steam in the heating members, the condensate being periodically blown out of the heating tube.

A still further object of this invention is to provide an improved seal for the heating elements so that the heating elements may be lowered or raised, the heating elements being substantially balanced so that they can be raised or lowered with slight effort.

A further object of this invention is to provide a means of heating the gum so the heat will be distributed all through the mass of gum which is a vast improvement over application of heat to external surfaces only. (Gum has a very low rate of heat conduction.)

A further object of this invention is to accomplish heating of the gum with heating elements of such shape that the trash in the gum will not get tangled up with the heating elements, the hot tubes being self-cleaning in this shape, whereas coils have been unsuccessful because trash would tangle up in the coils. This has caused numerous fires because the flash point of the trash is much lower than the flash point of gum, and the hot steam coils would actually ignite the trash. When a charge of rosin is turned out of the still it is necessary to remove the trash strainer quickly and sprinkle it with water to keep it from catching on fire when it is exposed to air.

With the foregoing objects and others which may hereinafter appear, the invention consists of the novel construction, combination and arrangement of parts as will be more specifically referred to and illustrated in the accompanying drawings, wherein is shown an embodiment of the invention, but it is to be understood that changes, variations and modifications may be resorted to which fall within the scope of the invention as claimed.

In the drawings:

Figure 1 is a detail side elevation of a turpentine still constructed according to an embodiment of this invention, Figure 2 is a fragmentary plan view of the device, Figure 3 is a sectional view taken on the line 3—3 of Figure 2, Figure 4 is a fragmentary sectional view taken on the line 4—4 of Figure 2, Figure 5 is a sectional view taken on the line 5—5 of Figure 3, Figure 6 is an enlarged fragmentary vertical section of one of the heating elements and the seal therefor, and Figure 7 is a fragmentary side elevation of the condensate discharge end of the still.

Referring to the drawings, the numeral 10 designates generally a receptacle or container within which the gum is adapted to be positioned. The receptacle 10 includes an upwardly arched bottom wall 11, an upwardly tapered side wall 12 and a dome-shaped top wall 13. The top wall 13 has secured thereto a filler neck or nipple 14 on which a closure 15 is adapted to be mounted. The top wall 13 also has secured thereto an upstanding nipple 16 to which is secured a cap 17 having a lead-off pipe 18. The pipe 18 is adapted to be connected to a condenser or the like for condensing the vapors rising into the cap 17.

The side wall 12 at the lower portion thereof is provided with an outlet connection 19 which may be closed by any suitable closure means during the heating of the gum within the still or body 10.

A pair of heating members or elements generally designated as 20 and 21 are correlated with the body 10 and are adapted to be connected to a suitable source of heating supply for heating the gum positioned in the body 10. The heating elements 20 and 21 are of like construction and the detailed description of one of these elements will apply equally as well to the other element.

The heating element 20 comprises a cylinder 22 which is formed with a flange 23 at the upper end thereof. A short cylindrical member 24 having a lower flange 25 is secured to the flange 23 by fastening members 26. A plate 27 is carried by the upper end of the cylindrical member 22 and a plate 28 is carried by the upper end of the intermediate cylindrical member 24. The two plates 27 and 28 form a steam chamber 29 therebetween. A cap 30 having a cylindrical side wall 31 and a lower flange 32 is secured by fastening members 33 to the upper flange 34 carried by the intermediate cylindrical member 24.

A pipe 35 is extended through the intermediate member 24 and is adapted to be connected by means of a flexible hose 36 to a source of steam or other heating supply. The cap 30 forms with the upper plate 28 a water chamber 37. A plurality of depending steam tubes 38 are secured at their upper ends to the plate 27 and are open at their upper ends so that steam in the chamber 29 will pass downwardly into the tubes 38. The lower ends of the tubes 38 are closed, as indicated at 39, and these tubes are of such length that they may be extended downwardly into the interior of the body 10 fairly close to the bottom wall for heating the gum within the body 10.

In order to provide a means whereby the cylindrical member 22 may be sealed with respect to the dome 13 and the body 10, I have provided inner and outer cylindrical members 40 and 41, respectively, which are disposed in concentric relation and provide a space 42 therebetween. A liquid seal 43 in the form of mercury or the like is adapted to be positioned within the space 42 so that the cylindrical member 22, when lowered in the space 42, will engage within the liquid 43 and thereby become sealed so that vapors or the like will be unable to leak out of the cylindrical members 40 and 41. The dome 13 is formed with an opening 44 concentric with the inner upstanding seal member 40 and through which the tubes 38 are adapted to be dependingly supported.

In order to provide for the removal of condensed steam which will be positioned in the lower ends of the heater tubes 29, I have provided an elongated tube 45 which is extended centrally and downwardly into a tube 38 and terminates at a point closely adjacent the bottom wall 39. Each tube 45 is extended upwardly through the steam chamber 29 being secured as at 46 in the plate 28, and the upper ends of the tubes 45 are extended above the plate 28 so that a considerable quantity of condensed steam may be positioned within the liquid chamber 37.

A water exhaust pipe 47 is connected to the side wall 31 of the cap 30 and has connected therewith a flexible hose 48. The hose 48 is connected to an expansion tank 49, and preferably a valve 50 is interposed in the length of the hose 48. Valve 50 is a rotatable valve having a motor or power member 51 connected to the stem 52 thereof so that valve plug within the valve housing may be rotated at the desired speed, in order to provide for the intermittent blowout of the condensed steam in the lower ends of the heater tubes 38.

A steam trap 53 is connected to the lower portion of the expansion tank 49 and has connected therewith a discharge pipe 54 for removing the condensate accumulating in the expansion tank 49. In order to provide for suspension of the heating elements 20 and 21 within the body 10, I have provided a flexible suspending member 55 which is connected at one end to an eye 56 carried by the dome 30. The flexible member 55 is trained over a series of pulleys 57 and a balancing weight 58 is connected to the opposite end of the flexible member 55.

In the use and operation of this still, the gum is discharged into the body 10 through the intake neck 14. The heating elements 20 and 21 are lowered into the body 10 and steam is discharged into the steam chamber 29 from the flexible steam hose 36. The steam in the chamber 29 will pass downwardly into the steam heating tubes 38 and may initially exhaust into the upper chamber 37 and from this chamber the steam may pass through the outlet 37 and hose 48 to the expansion tank 49.

When the steam has been applied to the heating members or elements 20 and 21 for a short period of time, water or condensate will collect in the lower ends of the heater tubes 38. The tubes 38 are periodically blown out by opening of valve 50 which is operated by the power member 51. The condensate in the lower ends of the tubes 38 will be discharged into the liquid chamber 37 and the pressure of steam in this chamber will be released so that the water or condensate may exhaust therefrom when valve 50 is periodically opened.

When the heating elements 20 and 21 are in any adjusted position, the sleeve or cylindrical member 22 will be immersed in the sealing liquid 43 so that the vapors rising in the dome 13 as the gum is heated will not be permitted to exhaust about the joint between the sleeve 22 and the stationary sleeves or cylindrical members 40 and 41.

After the gum has been heated to the desired degree, the upper surface of the heated gum may be skimmed by opening closure 15 and extending skimming elements into the interior of the body 10. At the time it is desired to skim floating material, such as trash or the like, the heating elements 20 and 21 are raised so that the tubes 38 will be out of the heated gum. The heating elements 20 and 21 are raised by pulling the weights 58 downwardly to the desired degree.

With a still as hereinbefore described, the trash or other undesirable material, which normally rises to the surface of the heated gum, will not adhere to the heating elements as is the case where the gum is heated by circularly arranged heater tubes or pipes within the body 10. It will of course be understood that the heating elements 20 and 21 may be periodically raised away from the sealing sleeves 40 and 41 so as to remove any adhering particles on the exterior of the tubes 38. Under normal conditions the tubes 38 will be free from trash or other particles due to the vertical positioning of these tubes within the heated gum. In addition, when the heating elements are raised or elevated the tubes will automatically become clean as the adhering particles will drop downwardly into the heated gum.

In order to provide for replenishing at least some of the water in the gum which may cook out or be carried off as vapor, I have provided a pipe 59 which is connected to a water source and to the still 10.

What I claim is:

1. A still comprising a hollow body having an inlet and an outlet, a vertical cylindrical member carried by the top of said body, a second cylindrical member within said first member, a liquid sealing means between said members, a heater comprising a cap, a plurality of heater members dependingly carried by said cap and extending through said second member into said body, a cylindrical sealing member carried by said cap and loosely extending between said first and second named members for engagement within said sealing means, and means supporting said heater member for vertical adjustment.

2. A still comprising a hollow body having an inlet and an outlet, a vertical cylindrical member carried by the top of said body, a second cylindrical member within said first member, a liquid sealing means between said members, a heater comprising a cap, a plurality of heater members dependingly carried by said cap and extending through said second member into said body, a cylindrical sealing member carried by said cap and loosely extending between said first and second named members for engagement within said sealing means, a flexible supporting member connected to said cap, and a weight connected to said flexible supporting member.

3. A still comprising a hollow body having an inlet and an outlet, a vertical cylindrical member carried by the top of said body, a second cylindrical member within said first member, a liquid sealing means between said members, a heater comprising a cap, a plurality of heater members dependingly carried by said cap and extending through said second member into said body, said cap including vertically spaced walls forming a lower intake steam chamber and an upper outlet chamber, each heater member comprising an outer tube closed at the bottom thereof and dependingly secured to the lowermost of said plates, and communicating with said lower chamber, and an inner tube terminating at its lower end adjacent the bottom of said outer tube and secured to the uppermost of said plates and extending upwardly into said upper chamber, the extension of said inner tubes upwardly into said upper chamber forming a liquid collecting chamber below the upper ends of said inner tubes within which the condensed heating medium is adapted to collect, a cylindrical sealing member carried by said cap and loosely extending between said first and second named members for engagement within said sealing means, and means supporting said heater member for vertical adjustment.

WILLIAM T. S. MONTGOMERY.

REFERENCES CITED

The following references are of record in the file of this patent:

UNITED STATES PATENTS

| Number | Name | Date |
|---|---|---|
| No number | Fisher | Apr. 24, 1830 |
| 1,667,168 | Reed | Apr. 24, 1928 |
| 526,613 | Carter | Sept. 25, 1894 |
| 12,852 | Bowman | May 15, 1855 |
| 20,371 | Reid | May 25, 1858 |
| 89,051 | Lamb | Apr. 20, 1869 |
| 163,100 | Orme | May 11, 1875 |
| 544,437 | Kleemann | Aug. 13, 1895 |
| 599,047 | Rider | Feb. 15, 1898 |
| 2,248,909 | Russell | July 8, 1941 |
| 2,332,450 | Mantle | Oct. 19, 1943 |
| 1,191,916 | Brooks | July 18, 1916 |
| 864,208 | Stevens | Aug. 27, 1907 |
| 947,662 | Hart | Jan. 25, 1910 |
| 50,935 | Johnson | Nov. 14, 1865 |
| 408,943 | Wagner | Aug. 13, 1889 |